(12) United States Patent
Rind et al.

(10) Patent No.: US 10,853,317 B2
(45) Date of Patent: Dec. 1, 2020

(54) DATA NORMALIZING SYSTEM

(71) Applicant: ADP, LLC, Roseland, NJ (US)

(72) Inventors: Marc Rind, Summit, NJ (US); Xiaojing Wang, Warren, NJ (US); James R. Haas, Bridgewater, NJ (US); Dong Meng, Parsippany, NJ (US); John Robert Catino, Jr., Scotch Plains, NJ (US); Nitin Kumar Tammewar, Telangana (IN); Surekha Avasarala, Telangana (IN); Hafeez Raji, New York, NY (US)

(73) Assignee: ADP, LLC, Roseland, NJ (US)

( * ) Notice: Subject to any disclaimer, the term of this patent is extended or adjusted under 35 U.S.C. 154(b) by 840 days.

(21) Appl. No.: 14/821,033

(22) Filed: Aug. 7, 2015

(65) Prior Publication Data

US 2017/0039213 A1 Feb. 9, 2017

(51) Int. Cl.
*G06F 16/16* (2019.01)
*G06Q 10/06* (2012.01)

(52) U.S. Cl.
CPC ............ *G06F 16/16* (2019.01); *G06Q 10/06* (2013.01)

(58) Field of Classification Search
CPC ............................ G06F 17/30115; G06F 16/16
USPC ......................................................... 707/822
See application file for complete search history.

(56) References Cited

U.S. PATENT DOCUMENTS

| | | | | | |
|---|---|---|---|---|---|
| 5,835,897 | A | * | 11/1998 | Dang | G16H 40/67 705/2 |
| 5,875,435 | A | * | 2/1999 | Brown | G06Q 20/10 705/30 |
| 6,820,266 | B1 | * | 11/2004 | Minakawa | G06F 16/258 719/313 |
| 7,567,988 | B2 | * | 7/2009 | Wolf | G06F 16/27 |
| 7,730,007 | B2 | * | 6/2010 | Salahshour | G06F 9/542 706/46 |
| 7,739,160 | B1 | * | 6/2010 | Ryan | G06Q 30/06 705/31 |
| 8,204,809 | B1 | * | 6/2012 | Wise | G06Q 40/06 705/35 |
| 8,595,103 | B1 | * | 11/2013 | Wargin | G06Q 10/06 705/35 |
| 8,626,769 | B1 | * | 1/2014 | Bhatt | G06Q 40/12 707/740 |
| 8,666,772 | B2 | * | 3/2014 | Kaniadakis | G06F 19/328 705/2 |
| 8,849,693 | B1 | * | 9/2014 | Koyfman | G06Q 30/02 705/14.1 |
| 9,384,061 | B1 | * | 7/2016 | Deivanayagam | G06F 9/4881 |
| 9,454,526 | B1 | * | 9/2016 | Kapoor | G06F 16/24564 |
| 9,578,678 | B2 | * | 2/2017 | Nielsen | E21B 7/046 |
| 9,659,062 | B1 | * | 5/2017 | Kapoor | G06F 16/24564 |

(Continued)

*Primary Examiner* — Mark E Hershley
(74) *Attorney, Agent, or Firm* — Yee & Associates, P.C.

(57) ABSTRACT

A method and apparatus for normalizing data. A computer system receives category data for a first code from a first client of a plurality of clients. The computer system also generates a category rule based on the category data. The computer system also assigns a category to a second code of a second client of the plurality of clients using the category rule. The category data is generated using input from the first client. Assigning the category to the second code of the second client comprises selecting the category rule to use to assign the category to the second code from a plurality of category rules.

28 Claims, 9 Drawing Sheets

(56) References Cited

U.S. PATENT DOCUMENTS

| | | | |
|---|---|---|---|
| 2002/0038305 A1* | 3/2002 | Bahl | G06Q 30/04 |
| 2002/0049624 A1* | 4/2002 | Raveis, Jr. | G06Q 30/02 705/316 |
| 2003/0216946 A1* | 11/2003 | Ferraro | G06Q 40/02 705/4 |
| 2003/0220912 A1* | 11/2003 | Fain | G06F 16/9558 |
| 2006/0190380 A1* | 8/2006 | Force | G06Q 30/04 705/35 |
| 2007/0143164 A1* | 6/2007 | Kaila | G06Q 10/10 705/301 |
| 2007/0299743 A1* | 12/2007 | Staib | G06Q 30/0204 705/7.33 |
| 2008/0133531 A1* | 6/2008 | Baskerville | G06F 21/6254 |
| 2008/0300939 A1* | 12/2008 | Oikonomidis | G06Q 40/00 705/7.11 |
| 2009/0100017 A1* | 4/2009 | Graves | G06Q 40/02 |
| 2009/0327194 A1* | 12/2009 | Berry | G06N 20/00 706/47 |
| 2010/0082371 A1* | 4/2010 | Kamp | G16H 10/60 705/3 |
| 2011/0077977 A1* | 3/2011 | Collins | G06Q 40/08 705/4 |
| 2011/0112851 A1* | 5/2011 | Poley | G06Q 40/08 705/2 |
| 2011/0238566 A1* | 9/2011 | Santos | G06Q 40/025 705/38 |
| 2011/0288962 A1* | 11/2011 | Rankin, Jr. | G06Q 30/02 705/27.1 |
| 2012/0047052 A1* | 2/2012 | Patel | G06Q 40/00 705/30 |
| 2012/0066253 A1* | 3/2012 | Osborn | G06Q 30/0201 707/769 |
| 2012/0069131 A1* | 3/2012 | Abelow | G06Q 10/067 348/14.01 |
| 2012/0185368 A1* | 7/2012 | Schloter | G06Q 40/12 705/30 |
| 2012/0284326 A1* | 11/2012 | Ennis | G06Q 10/06 709/203 |
| 2013/0007629 A1* | 1/2013 | Dani | G06F 16/215 715/744 |
| 2013/0046661 A1* | 2/2013 | Levin | G06Q 40/02 705/30 |
| 2013/0066677 A1* | 3/2013 | Killoh | G06Q 30/0277 705/7.29 |
| 2013/0185191 A1* | 7/2013 | Ganor | G06Q 40/02 705/39 |
| 2013/0204886 A1* | 8/2013 | Faith | G06Q 30/06 707/756 |
| 2013/0290234 A1* | 10/2013 | Harris | G06N 5/022 706/46 |
| 2014/0025695 A1* | 1/2014 | Bickle | G06F 16/972 707/756 |
| 2014/0074762 A1* | 3/2014 | Campbell | G06Q 40/02 706/46 |
| 2014/0129457 A1* | 5/2014 | Peeler | G06Q 10/067 705/317 |
| 2014/0196010 A1* | 7/2014 | Balachandran | G06F 8/70 717/124 |
| 2014/0280172 A1* | 9/2014 | Amir | G06F 16/182 707/740 |
| 2014/0337175 A1* | 11/2014 | Katzin | G06Q 20/367 705/26.62 |
| 2015/0120418 A1* | 4/2015 | Cervenka | G06Q 20/20 705/14.23 |
| 2015/0206207 A1* | 7/2015 | Narasimhan | G06Q 30/0283 705/400 |
| 2015/0281138 A1* | 10/2015 | Niu | G06F 16/9535 709/206 |
| 2015/0293764 A1* | 10/2015 | Visvanathan | G06F 8/36 717/102 |
| 2015/0302436 A1* | 10/2015 | Reynolds | G06Q 30/0201 705/7.32 |
| 2015/0347705 A1* | 12/2015 | Simon | G16H 10/60 705/3 |
| 2015/0379456 A1* | 12/2015 | Aynsley-Hartwell | G06Q 10/063114 705/7.15 |
| 2016/0013999 A1* | 1/2016 | Bond | H04L 67/10 709/224 |
| 2016/0301693 A1* | 10/2016 | Nikulin | H04L 9/3239 |
| 2017/0124617 A1* | 5/2017 | Spoelstra | G06Q 30/0621 |
| 2017/0236160 A1* | 8/2017 | Oberoi | G06Q 30/0269 705/14.66 |

\* cited by examiner

FIG. 6

| Paycode Name | Paycode Category | Paycode Subcategory | Edit |
|---|---|---|---|
| $Bonus | Other | Other | |
| $Tips | Regular | Regular | |
| 2nd Shift Diff | Regular | Regular | |
| 2nd Shift OT | Regular | Regular | |
| 3rd Shift Diff | Regular | Regular | |
| 3rd Shift OT | Regular | Regular | |
| All Hours | Regular | Regular | |
| All Non-Productive | Overtime | Scheduled | |
| All Other Leave | Absence | Planned PTO | |
| All Overtime | Absence | Planned PTO | |
| All PTO | Absence | Planned PTO | |
| All Premium | Absence | Planned PTO | |
| All Premium OT | Absence | Planned PTO | |
| All Reg OT | Absence | Planned PTO | |
| All Regular | Absence | Planned PTO | |
| All Worked | Overtime | Scheduled | |
| Bereavement | Absence | Leave | |
| CA Meal Penalty | Other | Other | |
| CFRA | Other | Other | |
| Callback | Overtime | Scheduled | |
| Double Time | Premium Time | Doubletime | |
| FMLA | Premium Time | Doubletime | |
| Hol-Worked | Overtime | Scheduled | |
| Holiday | Absence | Leave | |
| Jury | Premium Time | Doubletime | |
| On-Call | Overtime | Scheduled | |
| Overtime | Overtime | Scheduled | |
| Overtime Daily | Overtime | Scheduled | |

Tabs: Categorized (36) / Uncategorized (3)

Sidebar categories: All Categorized; Absence 15; Other 3; Overtime 7; Premium Time 3; Regular 8

Navigation: Overview, Dashboards, Metrics, Benchmarks, Tags

FIG. 7

| QS01FIT1 | Welcome, John Smith | ⚙ Preferences | 💬 Support | ✕ Log out |

Home | My Company | Myself | People | Process | Reports | Setup

Dashboards

Tags/Paycode ⓘ

EXPORT

Categorized (36) | Uncategorized (3)

Search Paycodes

[worked] 🔍 — 616
        701

| | ▲ Paycode Name | ▼ Paycode Category | ▼ Paycode Subcategory | Edit |
|---|---|---|---|---|
| All Categorized | $Bonus | Other | Other | |
| | $Tips | Regular | Regular | |
| Absence 15 | 2nd Shift Diff | Regular | Regular | |
| | 2nd Shift OT | Regular | Regular | |
| | 3rd Shift Diff | Regular | Regular | |
| Other 3 | 3rd Shift OT | Regular | Regular | |
| | All Hours | Regular | Regular | |
| | All Non-Productive | Overtime | Scheduled | |
| | All Other Leave | Absence | Planned PTO | |
| Overtime 7 | All Overtime | Absence | Planned PTO | |
| | All PTO | Absence | Planned PTO | |
| | All Premium | Absence | Planned PTO | |
| Premium Time 3 | All Premium OT | Absence | Planned PTO | |
| | All Reg OT | Absence | Planned PTO | |
| | All Regular | Absence | Planned PTO | |
| Regular 8   702 | All Worked | Overtime | Scheduled | |
| | Bereavement | Absence | Leave | |
| | CA Meal Penalty | Other | Other | |
| | CFRA | Other | Other | |
| | Callback | Overtime | Scheduled | |
| | Double Time | Premium Time | Doubletime | |
| | FMLA | Premium Time | Doubletime | |
| 704 → | Hol-Worked | Overtime | Scheduled | |
| | Holiday | Absence | Leave | |
| | Jury | Premium Time | Doubletime | |
| | On-Call | Overtime | Scheduled | |
| | Overtime | Overtime | Scheduled | |
| | Overtime Daily | Overtime | Scheduled | |

DATA NORMALIZING SYSTEM

BACKGROUND INFORMATION

1. Field

The present disclosure relates generally to managing data and, in particular, to categorizing organizational data. Still more particularly, the present disclosure relates to a method and apparatus for normalizing data.

2. Background

Information about organizations is often stored as a plurality of records in databases. These databases provide a mechanism to use the information to manage an organization. The organizations may be clients of data management or data analysis software. The plurality of records stored in the databases may be organized according to client specific codes. Analyzing the plurality of records across an organization may be more difficult or time consuming than desired because different departments may use different codes.

Benchmarking may allow an organization to compare itself to other organizations. Benchmarking may include comparing an organization's business processes and performance metrics to other organizations. In some instances, comparing information for the organization to information for other organizations may not be possible. If each organization has client specific codes, it may not be possible to determine the type of data each code indicates. If each organization has client specific codes, the accuracy of benchmarking may be lower than desired.

Categories may be created to group codes having similar characteristics or purposes. A client may associate each code with a category. By categorizing codes, the plurality of records may be normalized across the organization. Further, by categorizing the codes, the plurality of records may be normalized relative to other organizations using the categories. To categorize the codes, an employee may review and assign a category to each code individually. As a result, the time and resources needed to categorize codes for an organization may be greater than desired.

Therefore, it would be desirable to have a method and apparatus that take into account at least some of the issues discussed above, as well as other possible issues. For example, it would be desirable to have a method and apparatus that normalizes data.

SUMMARY

In one illustrative embodiment, a computer system comprises a category organizer. The category organizer receives category data for a first code from a first client of a plurality of clients. The category organizater also generates a category rule based on the category data using machine learning. The category organizer further identifies characteristics of a second client of the plurality of clients. The category organizer also identifies properties of a second code from the second client. The category organizer then selects the rule based on the characteristics of the second client and the properties of the second code. The category organizer then assigns a category to a second code of the second client using the category rule. The first code and the second code identify purposes of records in a database. The first code is selected from at least one of a payroll code, a task type code, or a job title code. The category data is generated using input from the first client in categorizing the first code. The input is selected from a search entry or a code correlation. Assigning the category to the second code of the second client comprises selecting the category rule to use to assign the category to the second code from a plurality of category rules. Assigning the category to the second code lowers a time of categorization for the second code and improves an accuracy of a benchmark. The first code and second code are client specific. The category is one of a plurality of categories common to all clients.

In another illustrative embodiment, a computer system comprises a category organizer. The category organizer receives category data for a first code from a first client of a plurality of clients. The category organizer also generates a category rule based on the category data. The category organizer also assigns a category to a second code of a second client of the plurality of clients using the category rule. The category data is generated using input from the first client. Assigning the category to the second code of the second client comprises selecting the category rule to use to assign the category to the second code from a plurality of category rules.

In another illustrative embodiment, a method for normalizing data is presented. A computer system receives category data for a first code from a client of a plurality of clients. The category data is generated using input from the first client. The computer system generates a category rule based on the category data. The computer system assigns a category to a second code of a second client using the category rule. Assigning the category to the second code of the second client comprises selecting the category rule to use to assign the category to the second code from a plurality of category rules.

In yet another illustrative embodiment, a computer program product for normalizing data comprises a computer readable storage media, first program code, second program code, and third program code stored on the computer readable storage media. The first program code receives category data for a first code from a first client of a plurality of clients. The category data is generated using input from the first client. The second program code generates a category rule based on the category data. The third program code assigns a category to a second code of a second client using the category rules. Assigning the category to the second code comprises selecting the category rule to use to assing the category to the second code from a plurality of category rules.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 is an illustration of a graphical user interface for categorizing records in accordance with an illustrative embodiment;

FIG. 7 is an illustration of illustration of a graphical user interface for categorizing records in accordance with an illustrative embodiment;

DETAILED DESCRIPTION

The illustrative embodiments recognize and take into account one or more different considerations. For example, the illustrative embodiments recognize and take into account that normalizing data may organize data such that the data may be directly comparable across multiple clients. Normalizing data may be a refinement process after receiving records for the clients. To normalize data, universal categories may be used rather than client-specific codes.

The illustrative embodiments recognize and take into account that computer resources may have a value. By decreasing the time needed to categorize a code, computer resources may be available for other processes. Thus, by decreasing the time to categorize a code, the efficiency of a computer system may be increased.

The illustrative embodiments also recognize and take into account that out-of-date data may have little to no value. The illustrative embodiments further recognize and take into account that value of benchmarking may dependent on the accuracy of the data and manual benchmarking may be subject to human error. Likewise, the illustrative embodiments recognize and take into account that manual classification of codes may be subject to human error and human fatigue.

The illustrative embodiments also recognize and take into account that benchmarking may allow companies to make business decisions based on their competitors. For example, a company may make decisions about pay increases for employee satisfaction and retention based on pay rates of other companies. As another example, a company may make decisions regarding a total number of manhours, overtime, or other labor costs based on labor costs of other companies. A company may use benchmarks to make hiring decisions. For example, a company may use benchmarks to decide a quantity of people to hire, a type of position to hire for, or a salary to offer. A company may use benchmarks to make decisions regarding a variety of products to carry, a sales price for products, or a quantity of each product to keep in stock. Using benchmarks may allow a company to be competitive in the workforce. Using benchmarks may allow a company to be more desirable to future employees. Using benchmarks may allow a company to strategically reduce costs including labor costs.

In some illustrative examples, benchmarks may allow a company to compare branches of the company to each other. For a large corporation, it may be desirable to compare metrics between divisions. However, each division may use different division specific codes. For example, by using benchmarking, a corporation may be able to compare vacation usage between different departments, different job titles, or different facilities. The corporation may be able to compare overtime between different departments for different parts of the year.

Figure 1:
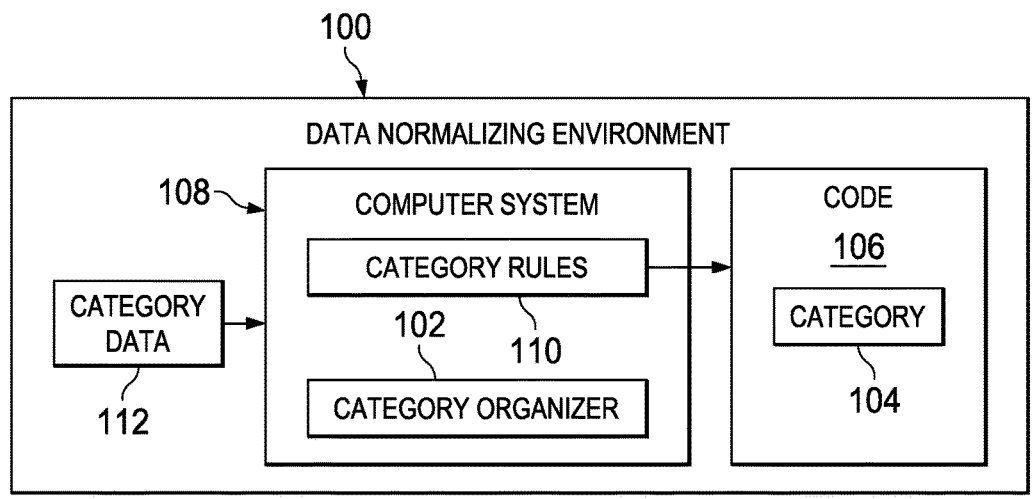
FIG. 1 is an illustration of a block diagram of a data normalizing environment in accordance with an illustrative embodiment.

Turning now to FIG. 1, an illustration of a block diagram of a data normalizing environment is depicted in accordance with an illustrative embodiment. In this illustrative example, data normalizing environment 100 includes category organizer 102. Category organizer 102 may assign category 104 to code 106 resulting in at least one of reduction in time of categorizing code 106 or improving an accuracy of a benchmark.

As used herein, the phrase "at least one of," when used with a list of items, means different combinations of one or more of the listed items may be used and only one of each item in the list may be needed. In other words, "at least one of" means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Category organizer 102 may be implemented in computer system 108. Computer system 108 is a hardware system that includes one or more data processing systems. When more than one data processing system is present, those data processing systems may be in communication with each other using a communications medium. The communications medium may be a network. The data processing systems may be selected from at least one of a computer, a server computer, a tablet, a mobile phone, or some other suitable data processing system.

In the illustrative example, category organizer 102 may be implemented in software, hardware, firmware or a combination thereof. When software is used, the operations performed by category organizer 102 may be implemented in program code configured to run on hardware, such as a processor unit. When firmware is used, the operations performed by category organizer 102 may be implemented in program code and data and stored in persistent memory to run on a processor unit. When hardware is employed, the hardware may include circuits that operate to perform the operations in category organizer 102.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Code 106 may identify a purpose of a number of records in a database. In some illustrative examples, code 106 may be for data for a new client. When code 106 is for a new client, code 106 may be categorized at or near the time of initializing service for the new client. By category organizer 102 assigning category 104 to code 106, time needed to categorize code 106 may be reduced. Further, when code 106 is for data for a new client, time for initialization of service for the new client may be reduced by category organizer 102 assigning category 104 to code 106.

Category organizer 102 may assign category 104 to code 106 using category rules 110. Category rules 110 may be generated by category organizer 102. Category organizer 102 may generate category rules 110 based on category data 112 received by category organizer 102. Category data 112 may include relevant data for assigned categories to a plurality of codes. Category data 112 may be generated from input from a number of clients. This input may be received from a touch screen, a mouse, a keyboard, or any other desirable input device.

Category organizer 102 may use machine learning to generate category rules 110. Machine learning algorithms can learn from examples provided in category data 112 and generate category rules 110. In some illustrative examples, multiple category rules of category rules 110 may be applicable to code 106. Each applicable category rule of category rules 110 may select an option for a category for code 106. The applicable category rules may be assigned a confidence and then ranked based on their respective confidences. Category 104 may be the category selected by the applicable category rule with the highest ranking and the highest confidence.

In some illustrative examples, category rules 110 may include at least one rule directed to code 106. For example, code 106 may be OVERTIME. Category rules 110 may include at least one rule relating specifically to codes having the title "OVERTIME." In other illustrative examples, category rules 110 may include at least one rule directed to properties of code 106. For example, code 106 may have a property of "time." In one example, the property of time may have a value of >9 pm. In one illustrative example, category rules 110 may have at least one rule relating to the property of "time." In yet other illustrative examples, category rules 110 may include at least one rule directed to a portion of the title of code 106. For example, code 106 may be "OTHOLIDAY." Category rules 110 may include at least one rule directed to codes having "OT" in the title.

By assigning category 104 to code 106 using category rules 110, category organizer 102 may reduce time to categorize code 106. For example, category organizer 102 may take less time to categorize code 106 than an operator categorizing code 106 using drop down selections or searches.

Further, by assigning category 104 to code 106 using category rules 110, accuracy of a benchmark may be increased. For example, the benchmark may not include codes that are not categorized. The benchmark may now have increased amounts of data by including code 106 with category 104.

As a result, computer system 108 operates as a special purpose computer system which enables at least one of faster categorization of code 106 or more accurate benchmarking, as compared to currently used database systems. For example, category organizer 102 may be used to transform computer system 108 into a special purpose computer. In particular, category organizer 102 transforms computer system 108 into a special purpose computer system as compared to currently available general computer systems that do not have category organizer 102.

For example, category organizer 102 may enable the categorization of code 106 in a manner that increases the speed at which information, such as performance results, may be accessed by a client. In particular, category organizer 102 may enable categorization of code 106 by computer system 108 without client input. Further, the manner in which category organizer 102 assigns category 104 to code 106 to transform code 106 into a form for use in performance results may occur in a manner that allows for users to view performance results, such as benchmarking, that are more accurate than is currently possible.

Figure 2:
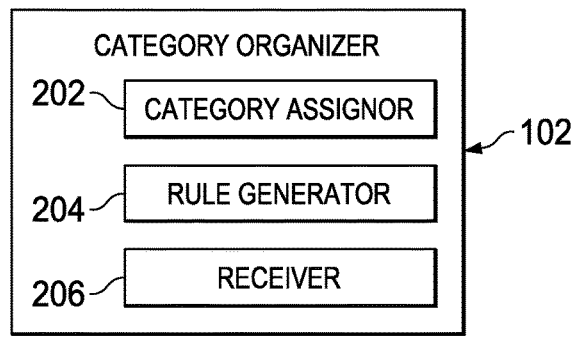
FIG. 2 is an illustration of a block diagram of a category organizer in accordance with an illustrative embodiment.

Turning now to FIG. 2, an illustration of a block diagram of a category organizer is depicted in accordance with an illustrative embodiment. In this illustration, an example of components in category organizer 102 is depicted. In the illustrative examples, the same reference numeral may be used in more than one figure. This reuse of a reference numeral in different figures represents the same element in the different figures.

Category organizer 102 may include category assignor 202, rule generator 204, and receiver 206. Receiver 206 may receive category data 112 of FIG. 1. Rule generator 204 may analyze category data 112 and generate category rules 110. Rule generator 204 may use machine learning algorithms to generate category rules 110. Category assignor 202 may assign category 104 to code 106 using category rules 110 generated by rule generator 204. Category assignor 202 may rank applicable category rules of category rules 110 based on confidence levels. The confidence levels may be based on at least one of characteristics of the client having code 106, properties of records with code 106, or properties of code 106 itself. Category assignor 202 may assign category 104 to code 106 using an applicable category rule with a highest confidence.

Figure 3:
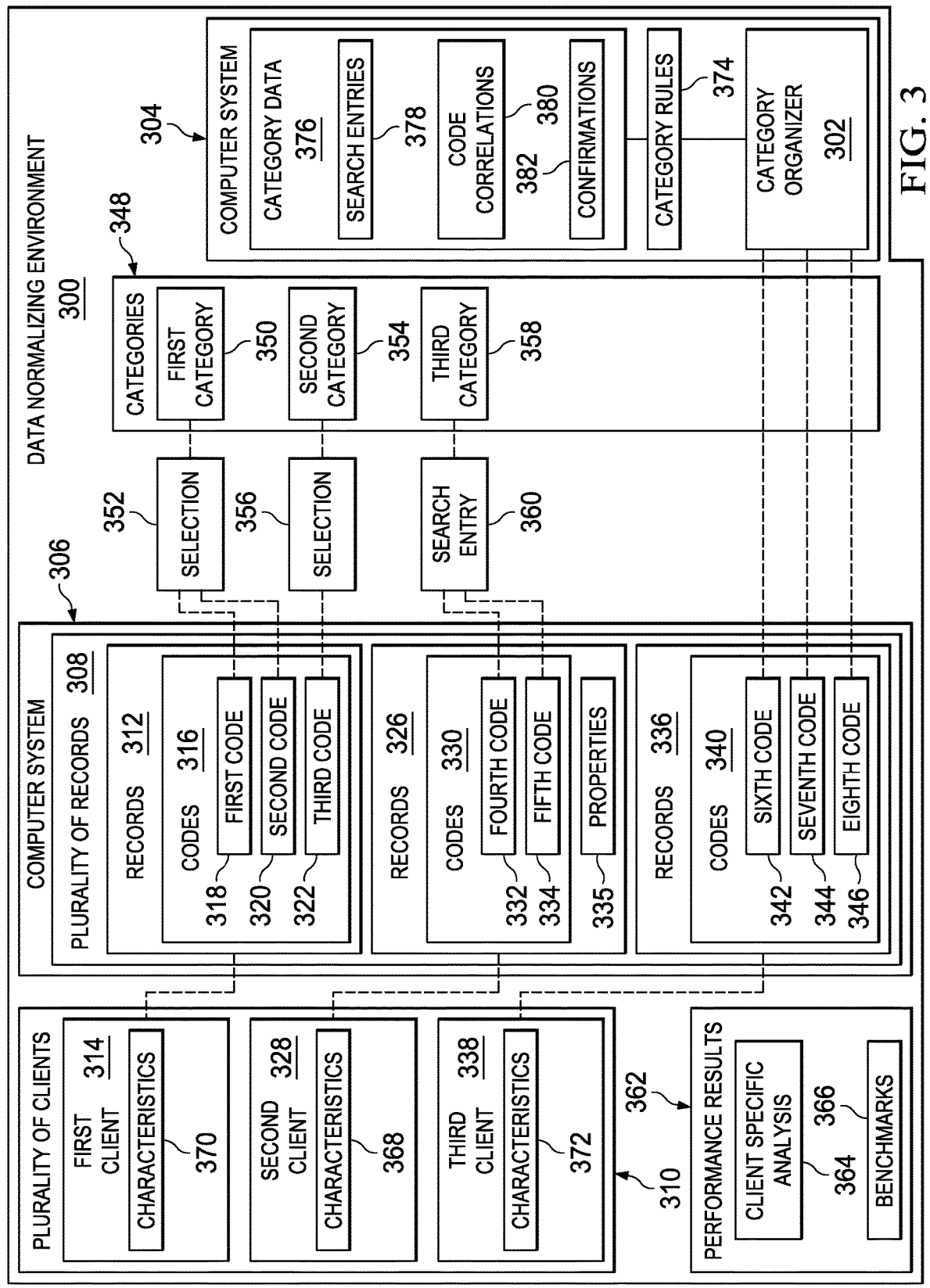
FIG. 3 is an illustration of a block diagram of data normalizing environment in accordance with an illustrative embodiment.

Turning now to FIG. 3, an illustration of a block diagram of data normalizing environment is depicted in accordance with an illustrative embodiment. Data normalizing environment 300 may be an implementation of data normalizing environment 100 of FIG. 1. Data normalizing environment 300 includes category organizer 302 implemented in computer system 304. Category organizer 302 may be substantially the same as category organizer 102 of FIG. 1. In some illustrative examples, category organizer 302 may have the components depicted in FIG. 2.

Data normalizing environment 300 may also have computer system 306. Computer system 306 is a hardware system that includes one or more data processing systems. When more than one data processing system is present, those data processing systems may be in communication with each other using a communications medium. The communications medium may be a network. The data processing systems may be selected from at least one of a computer, a server computer, a tablet, a mobile phone, or some other suitable data processing system.

Plurality of records 308 may be stored in computer system 306. In some illustrative examples, plurality of records 308 may be stored in at least one database on computer system 306. Plurality of records 308 may be associated with plurality of clients 310. A client may be a person, a grouping of people, or an organization.

Records 312 may be associated with first client 314 of plurality of clients 310. Records 312 may include any desirable information related to plurality of clients 310 such as payroll entries, job task entries, employment records, or any other desirable data entries. Records 312 may have codes 316. Codes 316 may be specific to first client 314. Codes 316 may identify purposes of records 312 in a database. Codes 316 may be selected from at least one of payroll codes, task type codes, job title codes, or any other desirable types of codes. Codes 316 may include first code 318, second code 320, and third code 322.

Records 326 may be associated with second client 328 of plurality of clients 310. Records 326 may have codes 330. Codes 330 may be specific to second client 328. Codes 330 may identify purposes of records 326 in a database. Codes 330 may be selected from at least one of payroll codes, task type codes, job title codes, or any other desirable types of codes. Codes 330 may include fourth code 332 and fifth code 334. Records 326 may also have properties 335. In some illustrative examples, at least one of fourth code 332 or fifth code 334 may have respective properties of properties 335.

Records 336 may be associated with third client 338 of plurality of clients 310. Records 336 may have codes 340. Codes 340 may identify purposes of records 336 in a database. Codes 340 may be selected from at least one of payroll codes, task type codes, job title codes, or any other desirable types of codes. Codes 340 may include sixth code 342, seventh code 344, and eighth code 346.

Codes 316 may be pre-existing independent of categories 348. For example, first client 314 may use codes 316 on a daily basis to organize records 312. However, codes 316 may not be general or easily comparable to other codes of other companies. It may be desirable to compare records 312 to records of other companies.

First client 314 may assign respective categories of categories 348 to codes 316. For example, an employee of first client 314 may assign first category 350 of categories 348 to first code 318. An employee of first client 314 may assign first category 350 to first code 318 through selection 352 of first category 350. In some illustrative examples, selection 352 may be performed using a drop-down menu. As depicted, first category 350 may be assigned to both first code 318 and second code 320 using selection 352. In this illustrative example, both first code 318 and second code 320 may be selected in any desirable method prior to performing selection 352. As a result, selection 352 may assign first category 350 to both first code 318 and second code 320. During or after selection 352, data related to selection 352 may be received by category organizer 302.

Second category 354 may be assigned to third code 322 using selection 356. Selection 356 may be for a single code. As a result, selection 356 may only assign second category 354 to third code 322. During or after selection 356, data related to selection 356 may be received by category organizer 302.

Codes 330 may be pre-existing independent of categories 348. For example, second client 328 may use codes 330 on a daily basis to organize records 326. However, codes 330 may not be general or easily comparable to other codes of other companies. It may be desirable to compare records 326 to records of other companies.

Second client 328 may assign respective categories of categories 348 to codes 330. For example, an employee of second client 328 may assign third category 358 of categories 348 to fourth code 332 and fifth code 334. An employee of second client 328 may assign third category 358 to fourth code 332 and fifth code 334 through search entry 360. During or after search entry 360, data related to search entry 360 may be received by category organizer 302. In some illustrative examples, search entry 360 may be a search for a code title. In some illustrative examples, search entry 360 may be a search for a property, such as properties 335.

For example, properties 335 may include wage multiplier, day, time, or any other desirable property. In one example, search entry 360 may be a search for a wage multiplier that is greater than 1. In another example, search entry 360 may be a search for a specific time range, for example, later than 9 pm.

An employee may perform a search with search entry 360. The employee may categorize all codes returned using search entry 360 to the same category. As depicted, both fourth code 332 and fifth code 334 may be returned using search entry 360. Afterwards, fourth code 332 and fifth code 334 may be assigned third category 358.

In some illustrative examples, first client 314 and second client 328 may pay for a service in which categories 348 may be used to provide performance results 362. For example, first client 314 may pay for a service in which categories 348 are used to provide client specific analysis 364. Client specific analysis 364 may include analysis of information to manage the organization of first client 314. Client specific analysis 364 may only analyze information specific to first client 314. The information may be related to at least one of income, employees, services, payroll, or other data for first client 314.

As another example, second client 328 may pay for a service in which categories 348 may be used to provide benchmarks 366. Benchmarks 366 for second client 328 may be comparisons of data of second client 328 to data of other clients in plurality of clients 310. For example, records 326 of second client 328 may be compared to records from plurality of records 308 of other clients in plurality of clients 310.

Benchmarks 366 may only be valuable with an adequate amount of data for comparison and accurate comparisons. Data including benchmarks 366 may be valuable within a limited period of time. For example, benchmarks 366 provided to a client 2 years after a request would likely be inapplicable to the conditions of the client upon receipt. Further, having the most up-to-date information for creating benchmarks 366 may be valuable.

Benchmarks 366 may necessarily be created using computer systems based on the timeframe benchmarks 366 may be valuable. Even if the data necessary for benchmarks 366 could be gathered, compiled, sampled, and displayed by hand, benchmarks 366 resulting would be undesirably late. Further, the amount of data to be gathered, compiled, sampled, and displayed may be undesirably large to done by hand.

Increasing the amount of data available for benchmarks 366 may cause benchmarks 366 to be more valuable. Increasing the amount of data available for benchmarks 366 may cause benchmarks 366 to be more valuable.

Data selected for benchmarks 366 may be based on characteristics 368 of second client 328. Characteristics 368 may include a region or country, an organizational size, a type of goods or services provided, or any other desirable characteristic of second client 328. To generate benchmarks 366 for second client 328, characteristics 368 may be compared to characteristics of other clients in plurality of clients 310 such as characteristics 370 of first client 314 or characteristics 372 of third client 338. However, if codes for any of plurality of clients 310 are not categorized, those codes may not be used to form benchmarks 366. Having more categorized codes may improve the accuracy of benchmarks 366.

In some illustrative examples, third client 338 may not have categorized codes 340. For example, third client 338 may be a new client. As another example, third client 338 may not pay for a service that provides performance results 362. As a result, third client 338 may not be provided the opportunity to categorize codes 340.

If third client 338 is a new client, it may be desirable to reduce the time of categorizing codes 340. If third client 338 does not pay for a service that provides performance results 362, it may be desirable to categorize codes 340 so that records 336 may be used to provide benchmarks 366 to other clients.

Category organizer 302 may be used to assign categories to codes 340. Category organizer 302 may use category rules 374 to assign categories to codes 340.

Computer system 304 may generate category rules 374 using machine learning. Machine learning algorithms can learn from examples provided in category data 376 and generate category rules 374.

Category rules 374 may be implementations of category rules 110 of FIG. 1. Category rules 374 may take into account at least one of characteristics of a client, properties of a code to be categorized, title of a code or other desirable condition.

Category rules 374 may be considered prediction option generators. Each category rule of category rules 374 may predict an option for a desired category of categories 348 to be assigned to a code. There may be several category rules of category rules 374 that could be potentially applied to a code to be categorized, such as sixth code 342. Each of the respective category rules may be assigned a confidence. The respective category rules may then be ranked based on this confidence. The highest ranking category rule may produce the preferred category from categories 348 for sixth code 342. However, other options from categories 348 may also be generated.

When categorizing codes 340, each relevant category rule of category rules 374 may generate a potential category from categories 348. Each potential category may be ranked based on the confidence level of the respective category rule. Each of category rules 374 may have a confidence level based on the similarity of the characteristics of the client that provided input to help form the respective category rule and the characteristics of the client having the code to be categorized. For example, if category rules 374 have a first category rule generated based on categorization of codes 316 of first client 314 having characteristics 370, and second category rule generated based on categorization of codes 330 of second client 328 having characteristics 368, the first category rule may have a higher confidence level for third client 338 if characteristics 370 are more similar to characteristics 372 than characteristics 368 to characteristics 372.

Further, each of category rules 374 may have a confidence level based on the similarity of a code to a previously categorized code. For example, each potential category rule of category rules 374 for sixth code 342 may be prioritized based on the similarity of the properties of sixth code 342 to the properties of the respective codes used to form the category rules. For example, first code 318 has first properties and is used to form a first category rule of category rules 374. Fourth code 332 may have fourth properties and may be used to form fourth category rule of category rules 374. Both the first category rule and the fourth category rule may be applicable to categorizing sixth code 342. To determine which of the first category rule or the fourth category rule has a higher priority, the first properties and the fourth properties may be compared to the properties of sixth code 342. The respective category rule associated with the more similar set of properties may have a higher confidence level. This respective category rule may thus have a higher priority. The category rule with the higher priority may be used to categorize sixth code 342. The category rule with the higher priority may be used to assign a category to sixth code 342. However, if a user determines that the assigned category is incorrect, a list of other potential categories from categories 348 may be displayed for a user to select from. This list of other potential categories may also be placed in order of confidence based on comparisons of the properties of the respective codes.

Category organizer 302 may generate category rules 374 based on category data 376. Category data 376 may be an implementation of category data 112 of FIG. 1. Category data 376 may include search entries 378, code correlations 380, and confirmations 382. Search entries 378 may include search entry 360. Search entries 378 may include at least one of the text searched for, the field searched, the categories returned from the search, the category selected, or the title of the codes categorized.

Code correlations 380 may include associations between codes and categories. For example, code correlations 380 may include the association of first category 350 with first code 318. Code correlations 380 may also include the association of first category 350 with second code 320.

Confirmations 382 may include responses to categorized codes. Confirmations 382 may include user responses to prompts to confirm or change a category assigned to a code by category organizer 302. In some examples, confirmations 382 may be a part of at least one of generation or refinement of category rules 374. In some examples, a confirmation of confirmations 382 may be a response by a client of plurality of clients 310. In some illustrative examples, confirmations 382 may also be referred to as confirmation data.

Category rules 374 may be generated based on categorization of client specific codes from plurality of clients 310. Category rules 374 may be created from gleaned information from categorization behaviors of plurality of clients 310 without plurality of clients 310 affirmatively creating category rules 374. Category rules 374 may be changed or modified over time based on additional incoming data. Category rules 374 may thus be created by a passive form of crowd sourcing. Plurality of clients 310 may perform categorizations to their own data which they would be performing anyway. These categorizations in turn supply category data 376 to computer system 304 for creating or updating category rules 374.

Category organizer 302 may use category data 376 from clients of plurality of clients 310 to categorize codes of other clients of plurality of clients 310. For example, category organizer 302 may assign a respective category to each of sixth code 342, seventh code 344, and eighth code 346. When third client 338 is a new client, category organizer 302 may assign a respective category to each of sixth code 342, seventh code 344, and eighth code 346 upon initialization.

Third client 338 may be polled for confirmation of the category for each of sixth code 342, seventh code 344, and eighth code 346.

In some illustrative examples, there may be conflicting or differing rules of category rules 374 that may be applicable to at least one of sixth code 342, seventh code 344, or eighth code 346. For example, categorization of codes 316 by first client 314 may result in rules of category rules 374 that conflict with rules generated based on categorization of codes 330 by second client 328. In these illustrative examples, computer system 304 may use additional information to determine which rules of category rules 374 to apply in categorizing codes 340.

For example, computer system 304 may compare characteristics 370 of first client 314 and characteristics 368 of second client 328 to characteristics 372 of third client 338. Whichever of first client 314 or second client 328 has characteristics most similar to characteristics 372 may guide which rules of category rules 374 are used to categorize codes 340. For example, first client 314 may have characteristics 370 that state first client 314 is a retail company. Second client 328 may have characteristics 368 that state second client 328 is a pharmaceutical company. Characteristics 372 may state that third client 338 is a retail company. In this example, rules of category rules 374 formed using categorization of codes 316 may be applied preferably over conflicting rules of category rules 374 formed using categorization of codes 330 when categorizing codes 340.

In the illustrative example, one or more technical solutions are present that overcome a technical problem with normalizing data more slowly, less completely, or less accurately than desired using a manual process. As a result, one or more technical solutions may provide a technical effect in which client specific codes may be categorized automatically to decrease the time of categorizing a code and increase the accuracy of benchmarks.

As a result, computer system 304 operates as a special purpose computer system in which category organizer 302 in computer system 304 enables automatic categorization of a code, reducing computer resources used by a client for categorization, and increases the accuracy of benchmarks. In particular, category organizer 302 transforms computer system 304 into a special purpose computer system as compared to currently available general computer systems that do not have category organizer 302.

The illustration of data normalizing environment 300 in FIG. 3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although codes 316 are depicted as including three codes, codes 316 may include any desirable number of codes. For example, codes 316 may include greater than or less than three codes. As another example, although categories 348 is depicted as having three categories, categories 348 may have any desirable number of categories. In some illustrative examples, categories 348 may have greater than or less than three categories. As another example, although plurality of records 308 are all depicted in computer system 306, in some illustrative examples some records of plurality of records 308 may be stored on a different computer system.

Figure 4:
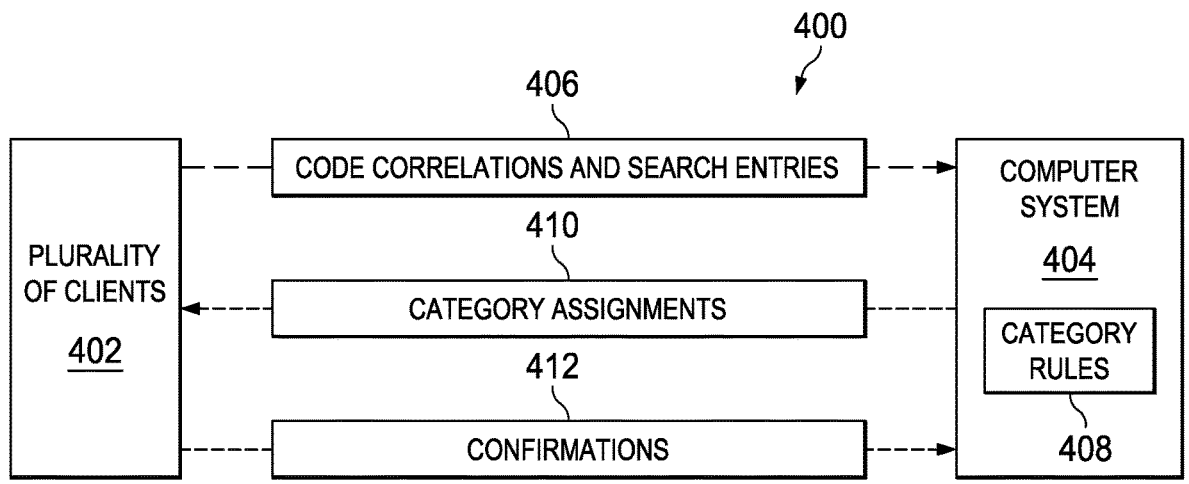
FIG. 4 is an illustration of a block diagram of data transfer in a data normalizing environment in accordance with an illustrative embodiment.

Turning now to FIG. 4, an illustration of a block diagram of data transfer in a data normalizing environment is depicted in accordance with an illustrative embodiment. Data transfer 400 may be an illustration of data flow in data normalizing environment 300 of FIG. 3. Specifically, data transfer 400 may be an illustration of data flow between plurality of clients 402 and computer system 404. Plurality of clients 402 may be an implementation of plurality of clients 310 of FIG. 3. Computer system 404 may be an implementation of computer system 304 of FIG. 3.

As depicted, plurality of clients 402 may generate code correlations and search entries 406. Plurality of clients 402 may generate code correlations and search entries 406 by categorizing codes. Computer system 404 may receive code correlations and search entries 406. Computer system 404 may generate category rules 408 based on code correlations and search entries 406. In some examples, category rules 408 may be modified based on code correlations and search entries 406. When category rules 408 reach a threshold accuracy, category rules 408 may be used to perform category assignments 410. The threshold accuracy may be any desirable level of accuracy. In some illustrative examples, the threshold accuracy may be 80% or higher.

Category assignments 410 may assign categories to previously uncategorized codes of plurality of clients 402. In response to category assignments 410, plurality of clients 402 may provide confirmations 412 of the assigned categories. Computer system 404 may use confirmations 412 to modify category rules 408.

Figure 5:
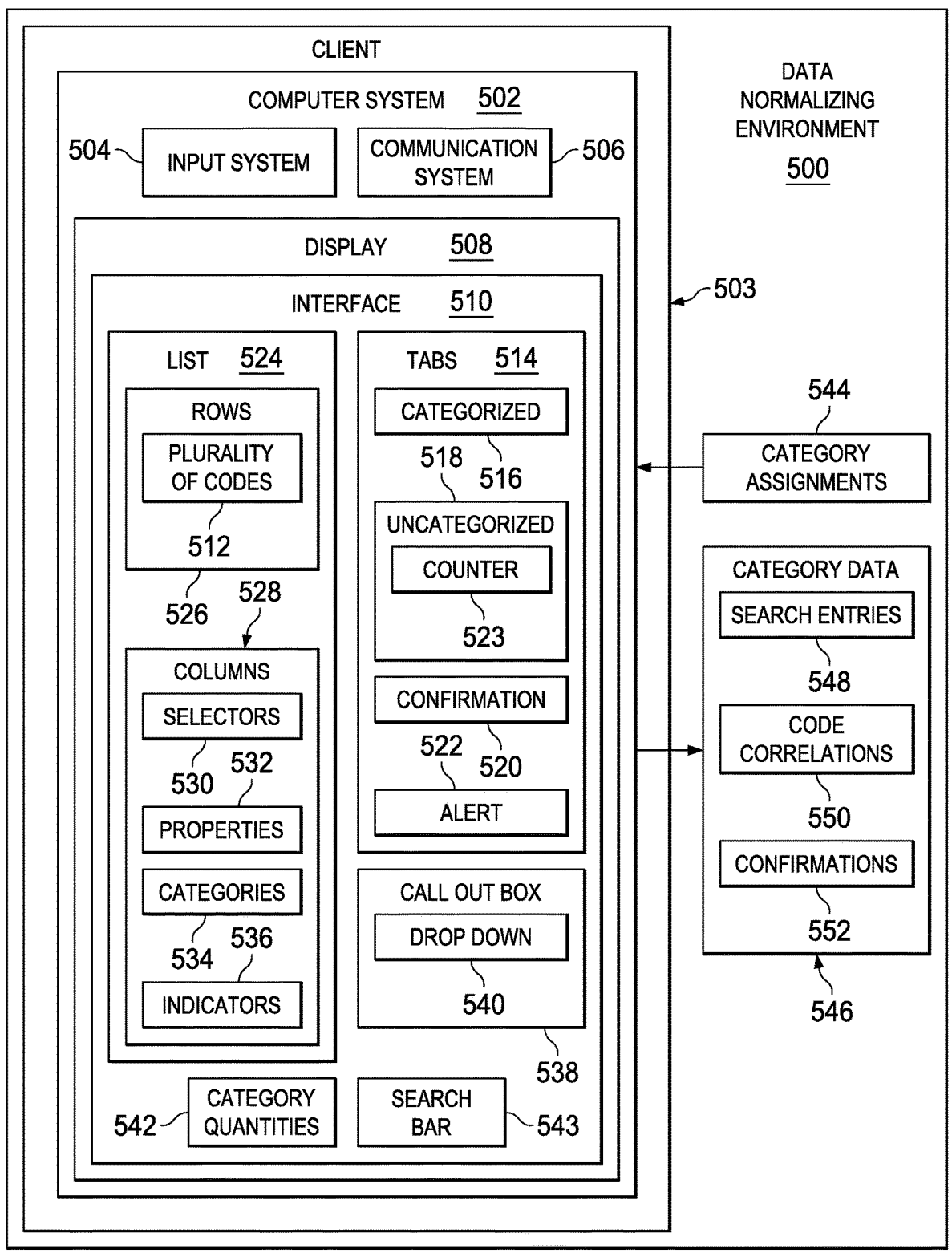
FIG. 5 is an illustration of a block diagram of a data normalizing environment in accordance with an illustrative embodiment.

Turning now to FIG. 5, an illustration of a block diagram of a data normalizing environment is depicted in accordance with an illustrative embodiment. Data normalizing environment 500 includes computer system 502 of client 503. Client 503 may be one of plurality of clients 310 of FIG. 3. In one example, client 503 may be first client 314 of FIG. 3.

Computer system 502 includes input system 504, communication system 506, and display 508. Display 508 may present interface 510 that displays plurality of codes 512. Plurality of codes 512 identifies purposes of records in a database. In some illustrative examples, the records may be records 312 of FIG. 3.

Interface 510 may allow a user to communicate with computer system 502. Interface 510 may have tabs 514 that divide plurality of codes 512 based on whether each code has been categorized. Tabs 514 may include at least one of categorized 516, uncategorized 518, confirmation 520, or alert 522. Categorized 516 may be a tab displaying codes that have been assigned a category. Uncategorized 518 may be a tab displaying codes that have not been assigned a category. Uncategorized 518 may include counter 523. Counter 523 may display a quantity of plurality of codes 512 not yet assigned a category.

Confirmation 520 may be a tab displaying codes that have been assigned categories by a third party. For example, confirmation 520 may be a tab displaying codes that have been assigned categories by category organizer 302 of FIG. 3. Confirmation 520 may be a tab displaying codes which should have the assigned categories confirmed. Alert 522 may be a tab displaying codes that have been assigned categories by a third party. For example, alert 522 may be a tab displaying codes that have been assigned categories by category organizer 302 of FIG. 3. Alert 522 may be a tab displaying codes that do not require confirmation of the assigned categories. Alert 522 may be a tab to provide a courtesy notice.

Each of tabs 514 may display a different subset of plurality of codes 512. Further, a code of plurality of codes 512 may move between tabs 514 based on its categorization status. For example, a code may initially be on uncategorized 518, but the code may be positioned on categorized 516 tab after the code is assigned a category.

Interface 510 may display a subset of plurality of codes 512 on each of tabs 514 in a format such as list 524. List 524 may include rows 526 and columns 528. Rows 526 may include plurality of codes 512.

Columns 528 may display a variety of data. Each column of columns 528 may display a different type of data. Columns 528 may include at least one of selectors 530, properties 532, categories 534, or indicators 536. Selectors 530 may be icons that may be activated to select a respective code in plurality of codes 512. For example, selectors 530 may take the form of at least one of a check box, a round button, or an icon. When selectors 530 take the form of check boxes or round buttons, multiple codes of plurality of codes 512 may be selected simultaneously. When selectors 530 take the form of icons, a single code may be edited at a time.

In some illustrative examples, when selectors 530 take the form of check boxes or round buttons, selecting multiple check boxes or round buttons may produce call out box 538. In some illustrative examples when selectors 530 take the form of icons, activating an icon may produce call out box 538. Call out box 538 may include data related to the number of codes of plurality of codes 512 that were selected. For example, call out box 538 may include respective properties of properties 532 for the single code. Call out box 538 may also include drop down 540. Drop down 540 may include a list of categories that could be assigned to the code.

Indicators 536 may indicate a category assigned to each code of plurality of codes 512. Indicators 536 may take any desirable form. In some illustrative examples, indicators 536 may include colors, shapes, icons, or other desirable components for indicating a category.

Properties 532 may include any desirable data for plurality of codes 512. For example, when plurality of codes 512 comprise payroll codes, properties 532 may include a rate multiplier, weekend versus weekday, short description, wage additional amount, unit, or average hours per day.

Categories 534 may include each category assigned to plurality of codes 512. In some illustrative examples, categories 534 in columns 528 may include all possible categories to be assigned to plurality of codes 512. For example, all categories present in drop down 540 may be present in columns 528 as categories 534. In some illustrative examples, categories 534 in columns 528 may include a subset of possible categories for plurality of codes 512.

Interface 510 may further include category quantities 542. Category quantities 542 may be a series of counters. Category quantities 542 may include a counter for each category that may be assigned to plurality of codes 512. For example, if plurality of codes 512 is a plurality of payroll codes, the categories may include absence, overtime, premium time, regular, and other. Each of absence, overtime, premium time, regular, and other may be assigned to a quantity of codes.

Interface 510 may include search bar 543. A user may provide input into search bar 543. Input may include numbers or letters. The input may be related to the names of plurality of codes 512 or properties 532. Input in search bar 543 may be used to select multiple codes of plurality of codes 512 for a category assignment.

Input system 504 may receive category assignments 544 or input to generate category assignments 544 for each of plurality of codes 512. In some illustrative examples, input system 504 may receive input from a user. In these examples, input system 504 may be at least one of a keyboard, a touchpad, a mouse, or a touchscreen. In these examples, input system 504 may receive category assignments 544 from a user.

In another example, input system 504 may receive input from another computer system. In this example, input system 504 may take the form of communication system 506. Communication system 506 may include any desirable types of communications links, such as wireless communications links, optical fiber cables, coaxial cables, a wire, or any other suitable type of communications link. When input system 504 takes the form of communication system 506, computer system 502 may receive category assignments 544 for plurality of codes 512 from a second computer system.

When a user provides category assignments 544 or input to generate category assignments 544, category data 546 related to category assignments 544 may be sent to a second computer. Communication system 506 may be used to send category data 546 to a second computer. Category data 546 may include at least one of search entries 548, code correlations 550, or confirmations 552. Search entries 548 may include text inputted into search bar 543 by a user. Search entries 548 may include category assignments 544 resulting from use of search bar 543. Code correlations 550 may include a code and the category assigned to the code. Code correlations 550 may be generated when a user assigns a category to a code using at least one of selectors 530, call out box 538, or drop down 540. Confirmations 552 may be a response by a user to a category assigned to a code by a second computer system.

Turning now to FIG. 6, an illustration of a graphical user interface for categorizing records is depicted in accordance with an illustrative embodiment. Graphical user interface 600 is an example of an interface for a client, such as first client 314 of FIG. 3, to categorize codes. Graphical user interface 600 may be an implementation of interface 510 of FIG. 5. Graphical user interface 600 includes categorized tab 602 and uncategorized tab 604. As depicted, thirty six codes are categorized while three codes are uncategorized. To normalize the uncategorized codes, a user may select uncategorized tab 604. Afterwards, the user may select categories for the uncategorized codes individually or assign categories based on a search.

As depicted, column 606 of categorized tab 602 presents a quantity of codes assigned to each category. Column 608 presents the titles of the thirty six categorized codes. Column 610 presents the assigned category for each respective code. Column 612 presents optional subcategories. Column 614 provides icons which may be activated to edit the category or subcategory assigned to each respective code. By clicking on an icon in column 614, a respective code in column 608 may be edited individually. In some illustrative examples, rather than selecting an icon in column 614, multiple codes in column 608 may be selected and their categories may be selected substantially simultaneously.

Graphical user interface 600 also includes search box 616. A user may use search box 616 to search the codes in column 608. A user may search for codes by code title, properties for a code, or some other desirable condition.

Turning now to FIG. 7, an illustration of a graphical user interface for categorizing records is depicted in accordance with an illustrative embodiment. View 700 may be a view of graphical user interface 600 with text 701 entered in search box 616. As depicted, a user may search for "worked" in the title of codes in column 608 of FIG. 6. A search for "worked" in search box 616 may return code 702 and code 704. Code 702 and code 704 are currently categorized as "overtime." If a user assigns a category to code 702 and code 704 after searching for "overtime," search entry data regarding this assignment of a category may be sent to a category organizer. For example, this search entry may form one of search entries 378 of FIG. 3.

Figure 8:
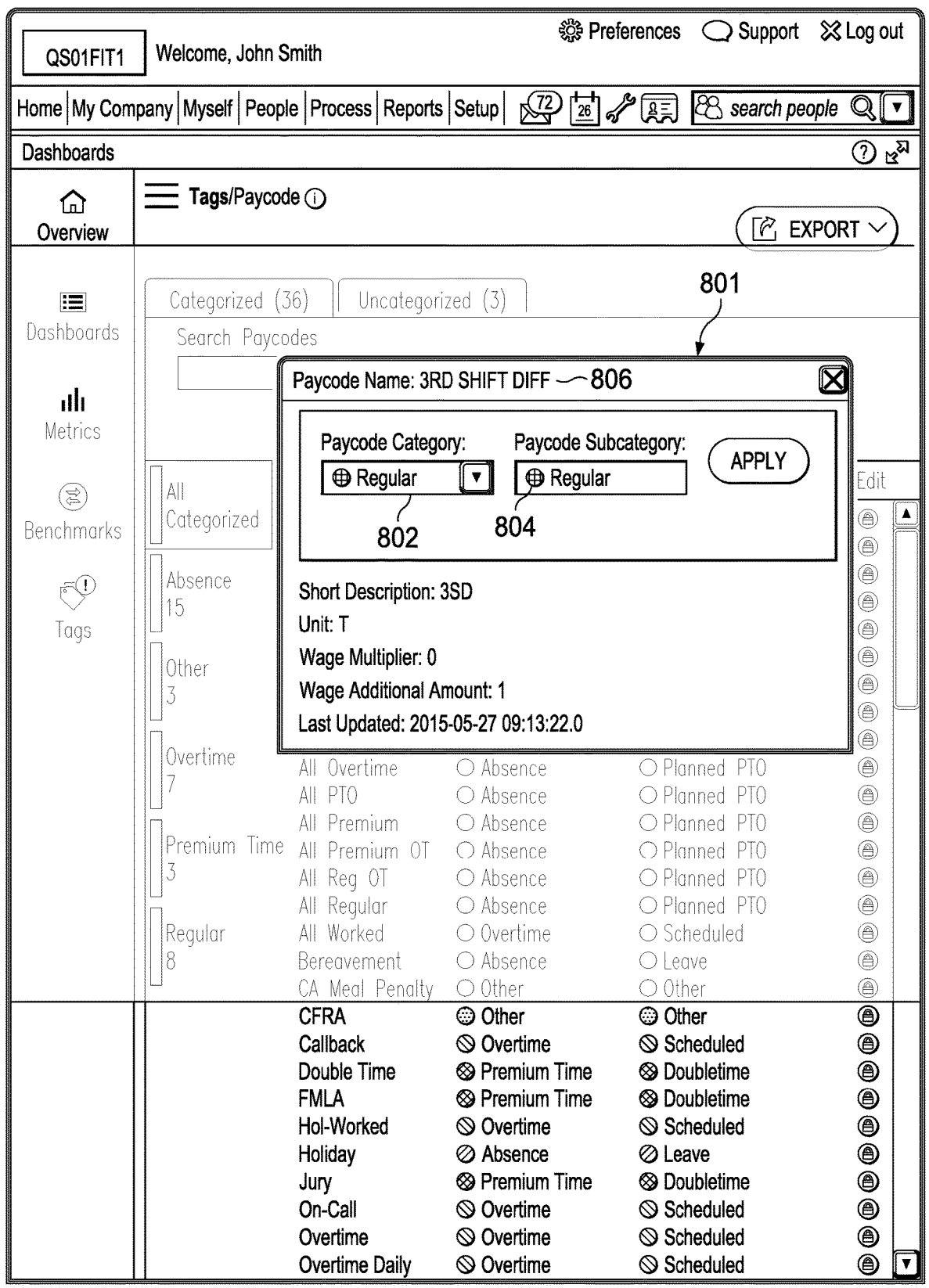
FIG. 8 is an illustration of illustration of a graphical user interface for categorizing records in accordance with an illustrative embodiment.

Turning now to FIG. 8, an illustration of a graphical user interface for categorizing records is depicted in accordance with an illustrative embodiment. View 800 may be of selection window 801 for a selection such as selection 352 of FIG. 3. Category 802 and subcategory 804 may be selected using a dropdown menu in section window 801. Selection window 801 may only be a selection window for code 806. As a result, only code 806 may be categorized using selection window 801.

The illustrations of graphical user interface 600 in FIGS. 6-8 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

In some illustrative examples, graphical user interface 600 may include additional tabs beyond categorized tab 602 and uncategorized tab 604. For example, graphical user interface 600 may include a confirmation tab, an alert tab, or any other desirable tab. A confirmation tab may be used to alert a user to categories assigned to codes by a category organizer, such as category organizer 302. A confirmation tab may prompt a confirmation of any category assignments displayed on the confirmation tab. Responses in the confirmation tab may provide additional category data to the category organizer as to the accuracy of performed category assignments. Further, responses in the confirmation tab may provide additional category data to modify category rules.

In some illustrative examples, all codes assigned categories by a category organizer may be displayed on a confirmation tab. In other examples, only codes assigned a category using a category rule having an accuracy below an accuracy threshold may be displayed on a confirmation tab. In these examples, codes assigned a category using a category rule having an accuracy above an accuracy threshold may be displayed on an alert tab. The alert tab may only provide information regarding assigned categories as a courtesy.

Further, although a drop-down menu is depicted in view 800, a selection may be performed using other methods. For example, a selection may be performed by activating a button representing a category. The button may have any desirable shape or content. For example, a series of buttons may be a series of small color coded buttons with no text. A legend may be provided for the colors. As another example, a series of buttons may take the form of rectangular buttons each containing a single category.

In some illustrative examples, the series of buttons may only be displayed in an individual window such as selection window 801. In other illustrative examples, the series of buttons may be displayed in categorized tab 602. When a series of buttons are displayed on categorized tab 602, codes in column 608 may be categorized directly on categorized tab 602 rather than in a separate selection window such as selection window 801.

Figure 9:
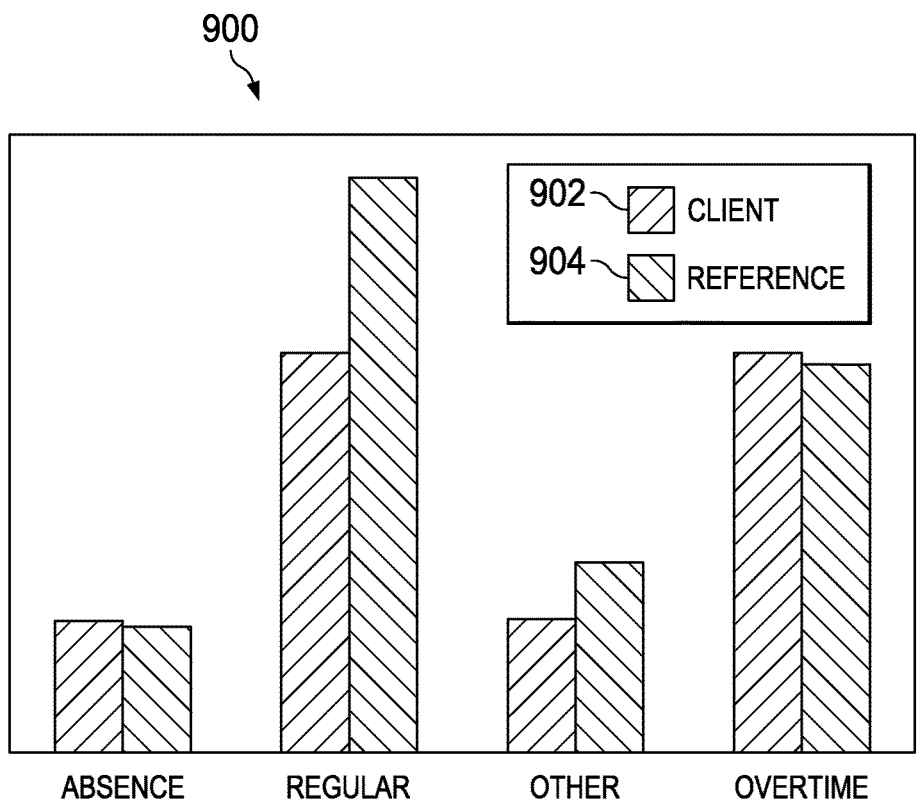
FIG. 9 is an illustration of a benchmarking graph in accordance with an illustrative embodiment.

Turning now to FIG. 9, an illustration of a benchmarking graph is depicted in accordance with an illustrative embodiment. Benchmarking graph 900 may be an implementation of benchmarks 366 of FIG. 3. Benchmarking graph 900 includes client data 902 and reference data 904. Client data 902 and reference data 904 may be selected based on common categories such as categories 348 of FIG. 3. For example, reference data 904 may be selected based on at least one of region, business type, number of employees, type of employees, amount of revenue, or other desirable categories. The records included in reference data 904 may be for organizations having at least one same or similar category as the organization having client data 902. For example, the client may be a grocery store in the northwest. In this example, reference data 904 may be of similarly sized competitors in the northwest. As another example, the client may be an emergency room with a small number of doctors on staff. Reference data 904 may be selected for similarly sized emergency rooms within a selected region or throughout the entire country.

By assigning global categories to client specific codes using a category organizer, records having the client specific codes may be normalized. By normalizing plurality of records of the client and other clients, benchmarking graph 900 may be more accurate than if the plurality of records were not normalized.

Figure 10:
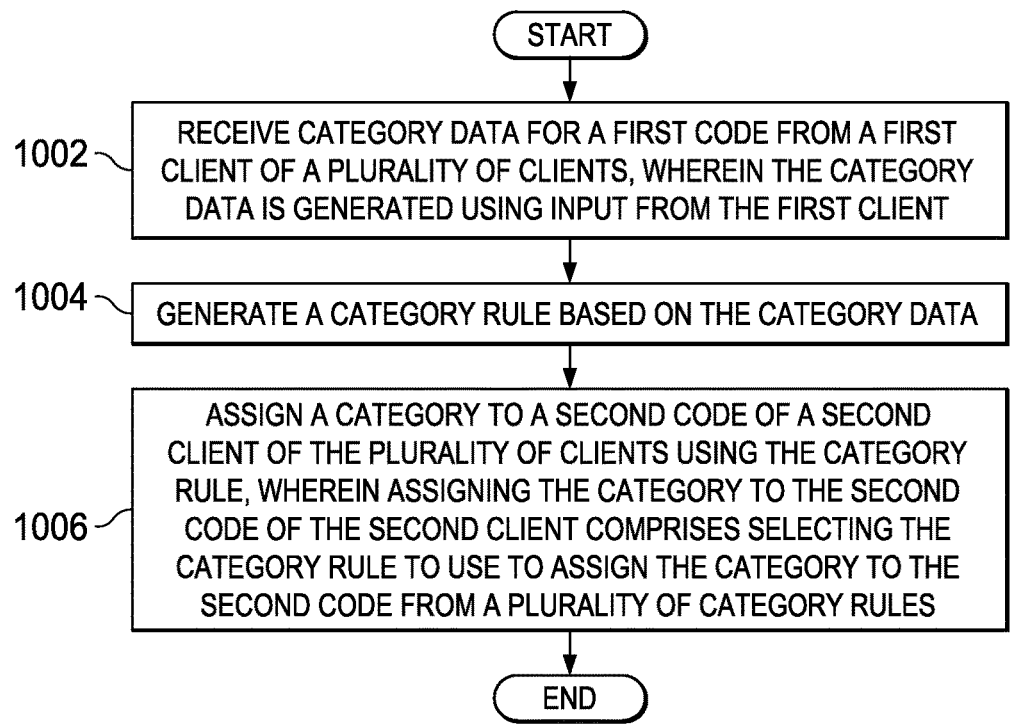
FIG. 10 is an illustration of a flowchart of a process for normalizing data in accordance with an illustrative embodiment.

Turning now to FIG. 10, an illustration of a flowchart of a process for normalizing data is depicted in accordance with an illustrative embodiment. The process illustrated in FIG. 10, may be implemented in data normalizing environment 100 of FIG. 1. In particular, the process may be implemented in category organizer 102 of FIG. 1.

The process begins by receiving category data for a first code from a first client of a plurality of clients, wherein the category data is generated using input from the first client (operation 1002). The category data may comprise at least one of a search entry, a code correlation, or a confirmation. The search entries may include at least one of a code word search or a search for a property. In some illustrative examples, the first code is one of a plurality of codes that is client specific.

The process generates a category rule based on the category data (operation 1004). The process assigns a category to a second code of a second client of the plurality of clients using the category rule, wherein assigning the category to the second code of the second client comprises selecting the category rule to use to assign the category to the second code from a plurality of category rules (operation 1006). In some illustrative examples, the category is selected from a plurality of categories common to all clients.

Figure 11:
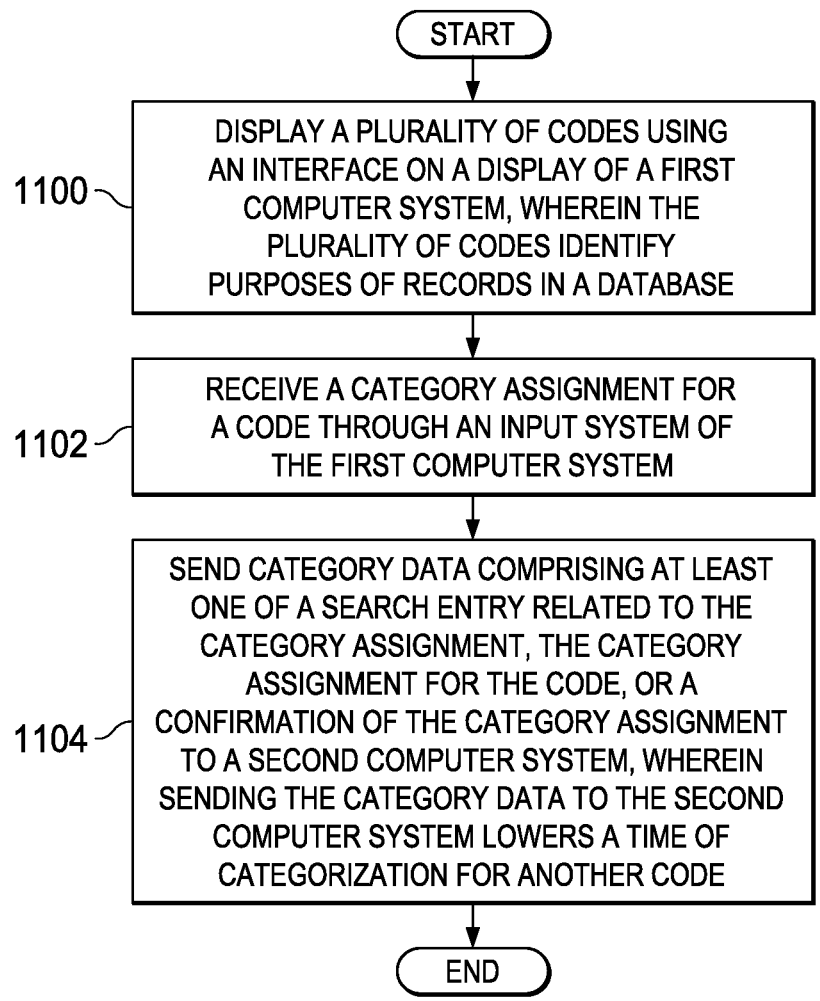
FIG. 11 is an illustration of a flowchart of a process for assigning categories to a plurality of codes in accordance with an illustrative embodiment.

Turning now to FIG. 11, an illustration of a flowchart of a process for assigning categories to a plurality of codes is depicted in accordance with an illustrative embodiment. The process illustrated in FIG. 11, may be implemented in data normalizing environment 500 of FIG. 5. In particular, the process may be implemented in computer system 502 of FIG. 5.

The process begins by displaying a plurality of codes using an interface on a display of a first computer system, wherein the plurality of codes identifies purposes of records in a database (operation 1100). The process receives a category assignment for a code through an input system of the first computer system (operation 1102). In some illustrative examples, the input system comprises at least one of a mouse, a keyboard, or a touchscreen. In some illustrative examples, the input system comprises at least one of a wired or wireless communication system, and wherein the category assignment for the code is provided by the second computer system. In some examples, the category assignment for the code is also for a second code, such that the code and the second code are categorized substantially simultaneously.

The process sends category data comprising at least one of a search entry related to the category assignment, the category assignment for the code, or a confirmation of the category assignment to a second computer system (operation 1104). Sending the category data to the second computer system lowers a time of categorization for another code.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

In one illustrative example, the process of FIG. 10 may further comprise generating a benchmark from the records in the database based on the category assigned to the code, wherein assigning the category to the code improves an accuracy of the benchmark. In another illustrative example, the process of FIG. 11 further comprises displaying a quantity of uncategorized codes. In yet a further example, the process of FIG. 11 may further comprise requesting a confirmation of the categorization of the code.

Figure 12:
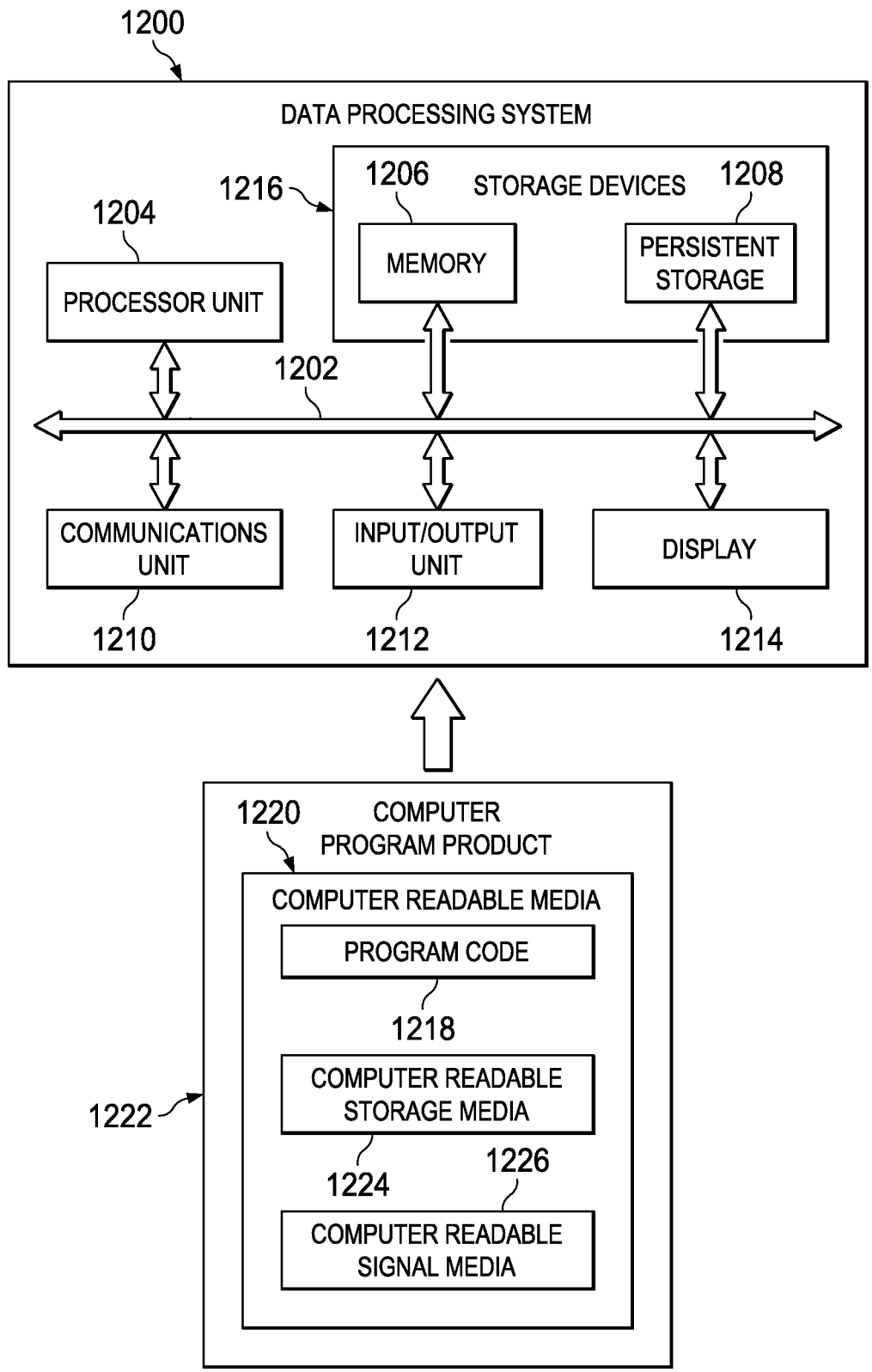
FIG. 12 is an illustration of a block diagram of a data processing system in accordance with an illustrative embodiment.

Turning now to FIG. 12, an illustration of a block diagram of a data processing system is depicted in accordance with an illustrative embodiment. Data processing system 1200 may be used to implement computer system 108 in FIG. 1. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 may take the form of a bus system.

Processor unit 1204 serves to execute instructions for software that may be loaded into memory 1206. Processor unit 1204 may be a number of processors, a multi-processor core, or some other type of processor, depending on the particular implementation.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer readable storage devices in these illustrative examples. Memory 1206, in these examples, may be, for example, a random access memory (RAM) or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that may be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs may be located in storage devices 1216, which are in communication with processor unit 1204 through communications framework 1202. The processes of the different embodiments may be performed by processor unit 1204 using computer-implemented instructions, which may be located in a memory, such as memory 1206.

These instructions are referred to as program code, computer usable program code, or computer readable program code that may be read and executed by a processor in processor unit 1204. The program code in the different embodiments may be embodied on different physical or computer readable storage media, such as memory 1206 or persistent storage 1208.

Program code 1218 is located in a functional form on computer readable media 1220 that is selectively removable and may be loaded onto or transferred to data processing system 1200 for execution by processor unit 1204. Program code 1218 and computer readable media 1220 form computer program product 1222 in these illustrative examples. In one example, computer readable media 1220 may be computer readable storage media 1224 or computer readable signal media 1226.

In these illustrative examples, computer readable storage media 1224 is a physical or tangible storage device used to store program code 1218 rather than a medium that propagates or transmits program code 1218. Alternatively, program code 1218 may be transferred to data processing system 1200 using computer readable signal media 1226. Computer readable signal media 1226 may be, for example, a propagated data signal containing program code 1218. For example, computer readable signal media 1226 may be at least one of an electromagnetic signal, an optical signal, or any other suitable type of signal. These signals may be transmitted over at least one of communications links, such as wireless communications links, optical fiber cables, coaxial cables, a wire, or any other suitable type of communications link.

The different components illustrated for data processing system 1200 are not meant to provide architectural limitations to the manner in which different embodiments may be implemented. The different illustrative embodiments may be implemented in a data processing system including components in addition to or in place of those illustrated for data processing system 1200. Other components shown in FIG. 12 can be varied from the illustrative examples shown. The different embodiments may be implemented using any hardware device or system capable of running program code 1218.

The illustrative embodiments thus provide an apparatus and method for normalizing data. A plurality of clients may manually categorize their client specific codes using universal categories. The categories may be the same across all of the plurality of clients.

A computer system including a category organizer receives category data from the manual categorization. The category data may be input for a machine learning algorithm to create a plurality of category rules. This form of input gathering may be similar to passive crowd-sourcing.

The plurality of category rules may be used to automatically assign categories to additional codes. The additional codes may be codes of a new client.

The new client may confirm the categories if the client agrees with the assigned categories. This confirmation may further increase the confidence of the category rules used to assign the categories. If the new client disagrees with the assigned categories, the client may instead manually select a different category. In some illustrative examples, alternative categories may be displayed to the client in a ranked order. The ranked order may be determined using the plurality of category rules.

By automatically assigning categories, the time to categorize a code may be reduced. By reducing the time to categorize a code, the efficiency of a client computer system may be increased. For example, the client may have a reduced number of manually classified codes. By reducing the number of manually classified codes, computer resources used during manual classification may also be reduced. This may leave computer resources free for other processes.

Accordingly, the user may more easily organize information and data, as well as computer functions, and cause the computer to operate more efficiently on that data and operate more efficiently with respect to software functions.

Further, automatically assigning categories may increase the available pool of data for benchmarking. Automatically assigning categories may also increase the accuracy of categorization of codes for benchmarking purposes. By increasing the available pool of data for benchmarking, benchmarks may be more accurate.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk—read only memory (CD-ROM), compact disk—read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computing device, comprising:
one or more processors; and
a computer-readable storage media including instructions for automatically assigning a category to data, wherein the instructions are configured to cause the one or more processors to:
receive category data for a first code from a first client of a plurality of clients, wherein the category data comprises association of the first code with a first category;
generate, using machine learning, a category rule based on the category data for the first code received from the first client;
identify characteristics of a second client of the plurality of clients;

identify properties of a second code received from the second client, the properties of the second code different than the characteristics of the second client;
after identifying the characteristics of the second client and the properties of the second code, select the category rule based on the characteristics of the second client and the properties of the second code; and
responsive to selecting the category rule, automatically assign the first category to the second code of the second client using the category rule, wherein:
the first code and the second code identify purposes of records in a database;
assignment of the first category to the second code normalizes database records associated with the first category across the first client and the second client;
the first code is selected from at least one of a payroll code, a task type code, or a job title code;
automatically assigning the first category to the second code of the second client comprises using the category rule to assign the first category to the second code;
the category rule is selected from a plurality of category rules;
the second code is different than the first code;
the first code is specific to the first client, and the second code is specific to the second client;
the first category is one of a plurality of categories common to the first client and the second client; and
improving accuracy of a benchmark by assigning the first category to the second code.

2. The computing device of claim 1, wherein the instructions are further configured to cause the one or more processors to:
identify properties of the first code;
identify characteristics of the first client;
compare the properties of the first code and the properties of the second code to form a first comparison; and
compare the characteristics of the first client and the characteristics of the second client to form a second comparison, wherein selecting the category rule based on the characteristics of the second client and the properties of the second code comprises selecting the category rule based on the first comparison and the second comparison.

3. The computing device of claim 1, wherein a title of the first code is different than a title of the second code.

4. The computing device of claim 1, wherein the benchmark comprises thousands of records.

5. The computing device of claim 1, wherein the first category assigned to the second code is one option of a plurality of possible category options for the second code, and the category rule has highest priority of the plurality of category rules based on at least one of properties of a second code or characteristics of the second client.

6. A computer system comprising:
at least one hardware processor;
a memory; and
a category organizer implemented by the at least one hardware processor and in communication with the memory, wherein the category organizer is configured to:
receive category data for a first code from a first client of a plurality of clients;
generate a category rule based on the category data; and
responsive to the category organizer receiving a second code from a second client of the plurality of clients, automatically assign a category to the second code using the category rule, wherein:
the category data is generated using input from the first client;
automatically assigning the category to the second code of the second client comprises using the category rule to assign the category to the second code from a plurality of category rules; and
assigning the category to the second code improves an accuracy of a benchmark.

7. The computer system of claim 6, wherein the benchmark comprises thousands of records.

8. The computer system of claim 6, wherein the first code is selected from at least one of payroll codes, task type codes, or job title codes.

9. The computer system of claim 6, wherein the category data comprises at least one of a search entry, a code correlation, or a confirmation.

10. The computer system of claim 9, wherein the search entry includes at least one of a code word search or a search for a property.

11. The computer system of claim 9, wherein the category organizer changes at least one category rule of the plurality of category rules based on the confirmation.

12. The computer system of claim 6 wherein the category organizer identifies characteristics for the second client, and selects the category rule from the plurality of category rules based on the characteristics of the second client.

13. The computer system of claim 6, wherein the first code and second code are client specific.

14. The computer system of claim 13, wherein the category organizer selects the category from a plurality of categories common to all clients.

15. A method, comprising:
automatically assigning a category to data by a computer system comprising:
receiving category data for a first code from a first client of a plurality of clients, wherein the category data is generated using input from the first client, wherein the first code is one of a plurality of codes and the plurality of codes identifies purposes of a plurality of records in a database;
generating a category rule based on the category data;
responsive to receiving a second code from a second client of the plurality of clients, automatically assigning the category to the second code using the category rule, wherein assigning the category to the second code of the second client comprises using the category rule to assign the category to the second code from a plurality of category rules;
generating a benchmark from the plurality of records in the database based on the category assigned to the second code; and
improving accuracy of a benchmark by assigning the first category to the second code.

16. The method of claim 15, further comprising the computer system:
Receiving confirmation data for the category.

17. The method of claim 16, further comprising the computer system:
changing at least one category rule of the plurality of category rules based on the confirmation data.

18. The method of claim 15, further comprising the computer system:
identifying characteristics of the second client; and selecting the category rule from the plurality of category rules based on the characteristics of the second client.

19. The method of claim 18, wherein the category data comprises at least one of a search entry, a code correlation, or a confirmation.

20. The method of claim 19, wherein the search entry includes at least one of a code word search or a search for a property.

21. The method of claim 15, wherein the first code and the second code are client specific.

22. The method of claim 21, wherein the computer system selects the category from a plurality of categories common to all clients.

23. The method of claim 15, wherein the benchmark comprises thousands of records.

24. A computer program product, comprising:
   a computer readable storage media including instructions for automatically assigning a category to data, wherein the instructions comprise:
      first program code for receiving category data for a first code from a first client of a plurality of clients, wherein the category data is generated using input from the first client, wherein the first code is one of a plurality of codes, the plurality of codes identifies purposes of a plurality of records in a database;
      second program code for generating a category rule based on the category data;
      third program code for, responsive to receiving a second code from a second client of the plurality of clients, automatically assigning a category to the second code using the category rule, wherein automated assignment of the category to the second code comprises automated use of the category rule to assign the category to the second code from a plurality of category rules;
      fourth program code for generating a benchmark from the plurality of records in the database based on the category assigned to the second code; and
      fifth program code for improving accuracy of a benchmark by assigning the first category to the second code.

25. The computer program product of claim 24, wherein the instructions further comprise:
   sixth program code for receiving confirmation data for the category, and for changing at least one category rule based on the confirmation data.

26. The computer program product of claim 25 wherein the instructions further comprise:
   seventh program code for identifying a plurality of characteristics of a second client, and for selecting the category rule from the plurality of category rules based on the plurality of characteristics of the second client.

27. The computer program product of claim 24, wherein:
   the first code and the second code are client specific; and
   the third program code selects the category from a plurality of categories common to all clients.

28. The computer program product of claim 24, wherein the benchmark comprises thousands of records.

* * * * *